United States Patent
Englund (10) Patent No.: US 11,874,417 B2
(45) Date of Patent: Jan. 16, 2024

(54) METHOD AND SYSTEM FOR DISTRIBUTED ACOUSTIC SENSING IN A MARINE ENVIRONMENT

(71) Applicant: Mark Andrew Englund, Mosman (AU)

(72) Inventor: Mark Andrew Englund, Mosman (AU)

(73) Assignee: Fiber Sense Limited, Mosman (AU)

( * ) Notice: Subject to any disclaimer, the term of this patent is extended or adjusted under 35 U.S.C. 154(b) by 607 days.

(21) Appl. No.: 16/631,770

(22) PCT Filed: Jul. 18, 2018

(86) PCT No.: PCT/AU2018/050757
§ 371 (c)(1),
(2) Date: Jan. 16, 2020

(87) PCT Pub. No.: WO2019/014721
PCT Pub. Date: Jan. 24, 2019

(65) Prior Publication Data
US 2020/0209417 A1 Jul. 2, 2020

(30) Foreign Application Priority Data
Jul. 18, 2017 (AU) .............................. 2017902820

(51) Int. Cl.
*G01V 1/38* (2006.01)
*G01V 3/08* (2006.01)
*G01V 1/22* (2006.01)

(52) U.S. Cl.
CPC ............... *G01V 1/226* (2013.01); *G01V 1/38* (2013.01); *G01V 3/08* (2013.01)

(58) Field of Classification Search
CPC . G01V 1/226; G01V 1/38; G01V 3/08; G01V 8/24; G01H 9/004
See application file for complete search history.

(56) References Cited

U.S. PATENT DOCUMENTS 5,296,957 A 3/1994 Takahashi et al.
7,136,156 B1 11/2006 Quint
(Continued)

FOREIGN PATENT DOCUMENTS

AU 2017200636 A1 2/2017
CN 101051869 A 10/2007
(Continued)

OTHER PUBLICATIONS

Eickmeyer et al., The Next Generation in Underwater Acoustic Detection, Jul./Aug. 1995, AT&T Technical Journal, pp. 4-15 (Year: 1995).*

(Continued)

*Primary Examiner* — Toan M Le
(74) *Attorney, Agent, or Firm* — Morgan, Lewis & Bockius LLP (57) ABSTRACT

The present invention relates to a system for distributed acoustic sensing in a marine environment surrounding a repeater along a fibre-optic submarine communications cable. The system includes at least one distributed acoustic sensing (DAS) unit. Each DAS unit further includes a light source that is configured to transmit outgoing light in at least one fibre-optic sensing cable that is located in the marine environment and a receiver configured to receive reflected light that includes at least one optical property influenced by an acoustic disturbance in the marine environment. Each DAS unit further includes an optical multiplexer for multiplexing optical signals onto the fibre-optic submarine communications cable via the repeater where the optical signals carry information on the at least influenced optical property. A method for distributed acoustic sensing in the marine environment is also disclosed.

20 Claims, 6 Drawing Sheets

(56) References Cited

U.S. PATENT DOCUMENTS

| | | |
|---|---|---|
| 2010/0158431 A1 | 6/2010 | Huffman et al. |
| 2011/0069302 A1 | 3/2011 | Hill et al. |
| 2012/0020184 A1 | 1/2012 | Wilson et al. |
| 2012/0226452 A1 | 9/2012 | Hill et al. |
| 2012/0230629 A1 | 9/2012 | Hill et al. |
| 2016/0252414 A1 | 9/2016 | Preston et al. |
| 2018/0145373 A1 | 5/2018 | Han et al. |

FOREIGN PATENT DOCUMENTS

| | | |
|---|---|---|
| CN | 102243795 A | 11/2011 |
| CN | 204271207 U | 4/2015 |
| CN | 110661001 A | 1/2020 |
| EP | 2753011 A1 | 7/2014 |
| GB | 2539894 A | 1/2017 |
| JP | 2005-310619 A | 11/2005 |
| JP | 2013-239433 A | 11/2013 |
| JP | 2014-075335 A | 4/2014 |
| JP | 2017-216090 A | 12/2017 |
| WO | WO2012005301 A1 | 1/2012 |
| WO | WO 2013/093478 A1 | 6/2013 |
| WO | WO 2015/061886 A1 | 5/2015 |
| WO | WO2015/158926 A1 | 10/2015 |
| WO | WO2017/102873 A1 | 6/2017 |
| WO | WO2018/045433 A1 | 3/2018 |
| WO | WO2018/085893 A1 | 5/2018 |

OTHER PUBLICATIONS

Edagawa et al., First Field Demonstration of Optical Submarine Cable System Using LD-Pumped Er-Doped Optical Fibre Amplifier, Sep. 14, 1989, Electronics Letters, vol. 25, No. 19, pp. 1278-1280 (Year: 1989).*

Fiber Sense Pty Ltd., Extended European Search Report, EP18835142. 3, dated Mar. 19, 2021, 7 pgs.

Englund, Mark Andrew, International Search Report and Written Opinion, PCT/AU2018/050757, dated Oct. 2, 2018, 8 pgs.

Fiber Sense Limited, Communication Pursuant to Article 94(3), EP17869895.7, dated Apr. 12, 2023, 47 pgs.

Ningde Amperex Technology Ltd., Examination Report, IN202217056412, dated Dec. 19, 2022, 7 pgs.

Office Action, JP2022-540973, dated Aug. 22, 2023, 4 pgs.

Office Action, CN202080007797.1, dated Jan. 5, 2023, 7 pgs.

Office Action, CN202080007797.1, dated Jun. 15, 2023, 4 pgs.

\* cited by examiner

METHOD AND SYSTEM FOR DISTRIBUTED ACOUSTIC SENSING IN A MARINE ENVIRONMENT

CROSS REFERENCE TO RELATED APPLICATIONS

This Application is a United States National Stage Application filed under 35 U.S.C. § 371 of PCT Patent Application Serial No. PCT/AU2018/050757 filed on Jul. 18, 2018, which claims the benefit of and priority to Australian Patent Application No. 2017902820 filed on Jul. 18, 2017, each of which is hereby incorporated by reference in its entirety.

FIELD OF THE INVENTION

The present invention generally relates to a method and system of distributed acoustic sensing in a marine environment.

BACKGROUND OF THE INVENTION

Marine environments requiring ISR (intelligence, surveillance and reconnaissance) often cover vast areas, making effective monitoring of these areas logistically difficult and expensive. Existing ISR methods for these areas generally include monitoring by satellites, sonar units mounted to the underside of a marine vessel or a sonar array towed behind a marine vessel.

Fibre-optic distributed acoustic sensing can detect acoustic events in surrounding regions along an optical fibre, whereby different types of incidents may cause different acoustic signatures in the acoustic event. In a marine environment, an acoustic event can be caused by incidents such as a marine vessel travelling through the area.

Some fibre-optic distributed acoustic sensing methods utilise a hydrophone detector that uses an optical signal to sense the acoustic disturbance occurring within the marine environment. The hydrophone detector converts these to an electric signal, which is communicated to a recording station, before being recorded at a recording station. These methods may be used, for example, in systems for temporary monitoring of the marine environment. The hydrophone detectors used in these sensing methods usually do not have access to a permanent source of power or a permanent mechanism for communicating the recorded information.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

Embodiments of a system for distributed acoustic sensing in a marine environment surrounding a repeater along a fibre-optic submarine communications cable, comprise:
  at least one distributed acoustic sensing (DAS) unit, each DAS unit comprising:
    a light source that is configured to transmit outgoing light in at least one fibre-optic sensing cable located in the marine environment; and
    a receiver configured to receive reflected light of the outgoing light that has been back scattered along the at least one fibre-optic sensing cable, the reflected light including at least one optical property influenced by an acoustic disturbance in the marine environment; and
  an optical multiplexer for multiplexing optical signals onto the fibre-optic submarine communications cable via the repeater, the optical signals carrying information on the at least influenced optical property.

In some embodiments, the optical multiplexer is configured to multiplex the optical signals onto the fibre-optic submarine communications cable via a loop back coupler of the repeater.

In some embodiments, the optical multiplexer is configured to time-multiplex and/or frequency-multiplex the optical signals with other optical signals carried on the fibre-optic submarine communications cable.

In some embodiments, the optical multiplexer includes an optical transmitter configured to generate the optical signals based on the information on the at least influenced optical property.

In some embodiments, the at least one DAS unit is powered by the repeater.

In some embodiments, the at least one fibre-optic sensing cable comprise at least two fibre-optic sensing cables and wherein the at least one DAS unit comprises multiple spaced apart DAS units, wherein the DAS units are connected via a distribution hub which in turn communicates with the repeater via a power and data cable.

In some embodiments, the at least one of the fibre-optic sensing cables is provided with a magneto-restrictive coating for distributed magnetic sensing in the marine environment surrounding the repeater.

In some embodiments, a combination of fibre-optic acoustic and fibre-optic magneto-restrictive sensing cables provide both distributed acoustic and distributed magnetic sensing in the same marine environment.

Embodiments of a method for distributed acoustic sensing in a marine environment surrounding a repeater along a fibre-optic submarine communications cable, comprise:
  transmitting outgoing light from a light source of at least one distributed acoustic sensing (DAS) unit in at least one fibre-optic sensing cable located in the marine environment;
  receiving reflected light of the outgoing light at a receiver of the at least one DAS unit, the reflected light being outgoing light that has been back scattered along the at least one fibre-optic sensing cable and includes at least one optical property influenced by an acoustic disturbance in the marine environment; and
  multiplexing, via an optical multiplexer, optical signals onto the fibre-optic submarine communications cable via the repeater, the optical signals carrying information on the at least influenced optical property.

In some embodiments, the multiplexing of the optical signals onto the fibre-optic submarine communications cable is performed via a loop back coupler of the repeater.

In some embodiments, the multiplexing occurs via time-multiplexing and/or frequency multiplexing of the optical signals onto the fibre-optic submarine communications cable.

In some embodiments, the method further comprises generating, at an optical transmitter of the optical multiplexer, the optical signals based on the information on the at least influenced optical property.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 2b is a diagram of the DAS unit shown in FIG. 2a;

DETAILED DESCRIPTION OF THE EMBODIMENTS

Fibre-optic submarine communication cables are laid on the sea floor between land-based communication stations and are used to transmit digital data, such as telephone, Internet and private data, across spatially vast marine environments. Repeaters (e.g. two-way amplifiers) are placed at intervals along the fibre-optic submarine communication cable and are used to amplify the optical signal that would otherwise be attenuated during its transmission across the marine environment. The repeaters may be powered by electrical conductors located in the submarine communication cables and are typically connected to a land-based power source.

The principle of fibre-optic distributed acoustic sensing relies on the occurrence of an acoustic event, from a stationary or moving object, causing a corresponding localised perturbation of the refractive index of an optical fibre. Due to the perturbed refractive index, an optical signal that is transmitted along the optical fibre and then back-scattered in a distributed manner (e.g. via Rayleigh scattering or other similar scattering phenomena) along the length of the fibre will include fluctuations (e.g. in intensity and/or phase) over time. The magnitude of the fluctuations relates to the severity or proximity of the acoustic event. The timing of the fluctuations along the distributed back-scattering time scale relates to the location of the acoustic event.

The present disclosure includes a method and system for distributed acoustic sensing, using in part a repeater located along a fibre-optic submarine communications cable. Utilizing the disclosed methods and systems, information related to a detected acoustic event is communicated onto the fibre-optic submarine communications cable, via the repeater. The information may be multiplexed with other signals carried by the fibre-optic submarine communications cable, for example using wavelength division multiplexing and/or time division multiplexing.

The disclosed system and method may be used with purposely deployed fibre-optic submarine communication cables dedicated to distributed acoustic sensing or, if available, existing fibre-optic submarine communication cables, where one or more of the optical fibres are reserved for distributed acoustic sensing.

Figure 1:
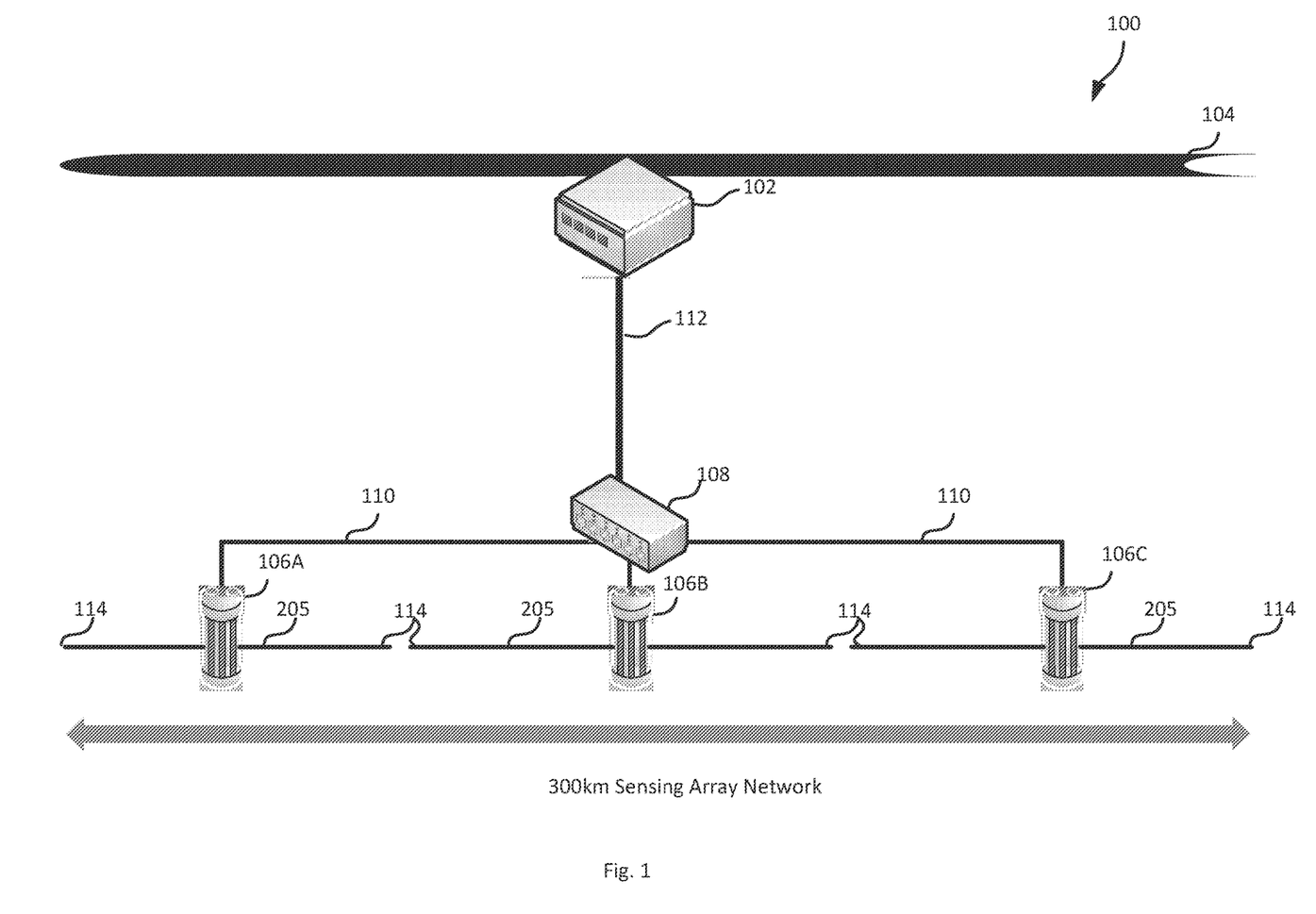
FIG. 1 is a diagram of a system for distributed acoustic sensing in a marine environment.

An example system 100 for distributed acoustic sensing in a marine environment surrounding a repeater 102, at a location along a fibre-optic submarine communications cable 104, is shown in FIG. 1. In general, the disclosed system 100 includes at least one distributed acoustic sensing (DAS) unit 106, with FIG. 1 showing three DAS units 106A, 106B and 106C. Each DAS unit 106 is communicatively connected to at least one fibre-optic sensing cable 205. The at least one fibre-optic sensing cable 205 is also weighted or otherwise anchored at its free end 114 and at appropriate intervals along the cable in order to anchor the fibre-optic sensing cable to the seafloor. In the example of FIG. 1, each DAS unit 106 is communicatively connected to two fibre-optic sensing cables 205 and positioned in a linear configuration with respect to one another. It will be appreciated that the DAS unit 106 can be positioned on the seafloor in any configuration, for example, a linear or non-linear configuration, which may be 2D or 3D, such as a serpentine or zig-zag configuration.

In one embodiment, at least one fibre-optic sensing cable 205 may comprise a magneto-restrictive coating for distributed magnetic sensing in the marine environment surrounding the repeater. The magneto-restrictive coated fibre-optic sensing cable 205 may detect magnetic field perturbations created by a magnetic source, such as a marine vessel, travelling within the marine environment. The presence of the magnetic source, from a stationary or moving object, will cause a corresponding localised perturbation of the magnetic field surrounding the fibre-optic sensing cable 205 and in turn the refractive index of the fibre-optic sensing cable 205. Due to the perturbed refractive index, an optical signal that is transmitted along the sensing fibre-optic cable 205 is back-scattered in a distributed manner (e.g. via Rayleigh scattering or other similar scattering phenomena) along the length of the fibre and will include fluctuations (e.g. in intensity and/or phase) over time. The magnitude of the fluctuations relates to the severity or proximity of the magnetic source. The timing of the fluctuations along the distributed back-scattering time scale relates to the location of the magnetic source.

In the embodiment shown in FIG. 1, one fibre-optic sensing cable 205 extending from each DAS unit 106 may be provided with a magneto-restrictive coating, with the remaining fibre-optic sensing cable 205 is provided with a non-magneto-restrictive coating. This configuration of fibre-optic sensing cables 205 may provide for both distributed acoustic and distributed magnetic sensing in the same marine environment.

In the embodiment shown in FIG. 1, each DAS unit 106 is coupled to a distribution hub 108 via a power and data cable 110. The distribution hub 108 is connected to the repeater 102 of the fibre-optic submarine cable 104, by a power and data cable 112. The distribution hub 108 may be spaced from the repeater 102 of the fibre-optic submarine cable 104 at any suitable distance for power and data communication purposes. In one example, the distribution hub 108 may be 10-50 km from the repeater 102 of the fibre-optic submarine cable 104, with the power and data cables 110 and 112 being similarly anchored to the seafloor. More than one hub 108 may be provided for each repeater, allowing for an increased number of DAS units 106 communicatively connected to the repeater where required. Other architectures may be used depending on requirements for the system, including a direct connection between the DAS 106 and the repeater 102, in which case the power and data cable 110 extends between the DAS unit 106 and the repeater 102, and including use of other network components, including routers and switches. In other embodiments power and data may be carried on separate cables between the DAS unit(s) 106, hub(s) 108 and repeater 102. The network or communication line between the DAS unit(s) 106 and the repeater may be in either the electrical or optical or acoustic domain.

In one embodiment, each DAS unit 106 transmits data signals, which carry information relating to at least one optical property that has been influenced by an acoustic disturbance in the marine environment, via the data carrying component of the power and data cable 110, to the distribution hub 108. The distribution hub 108 passes these data signals onto the repeater 102 via the data carrying component of the power and data cable 112. The repeater 102 transmits these data signals from the repeater to the fibre-optic submarine cable 104 via data cable 306 (FIG. 3b). In some embodiments the communication is unidirectional, from the DAS unit(s) 106 to the repeater 102. In other embodiments the communication is bidirectional allowing for example, control signals to be communicated from the repeater 102 to the DAS unit(s) 106. The control signals may be received by the repeater 102 over the fibre-optic submarine cable 104.

Figure 2A:
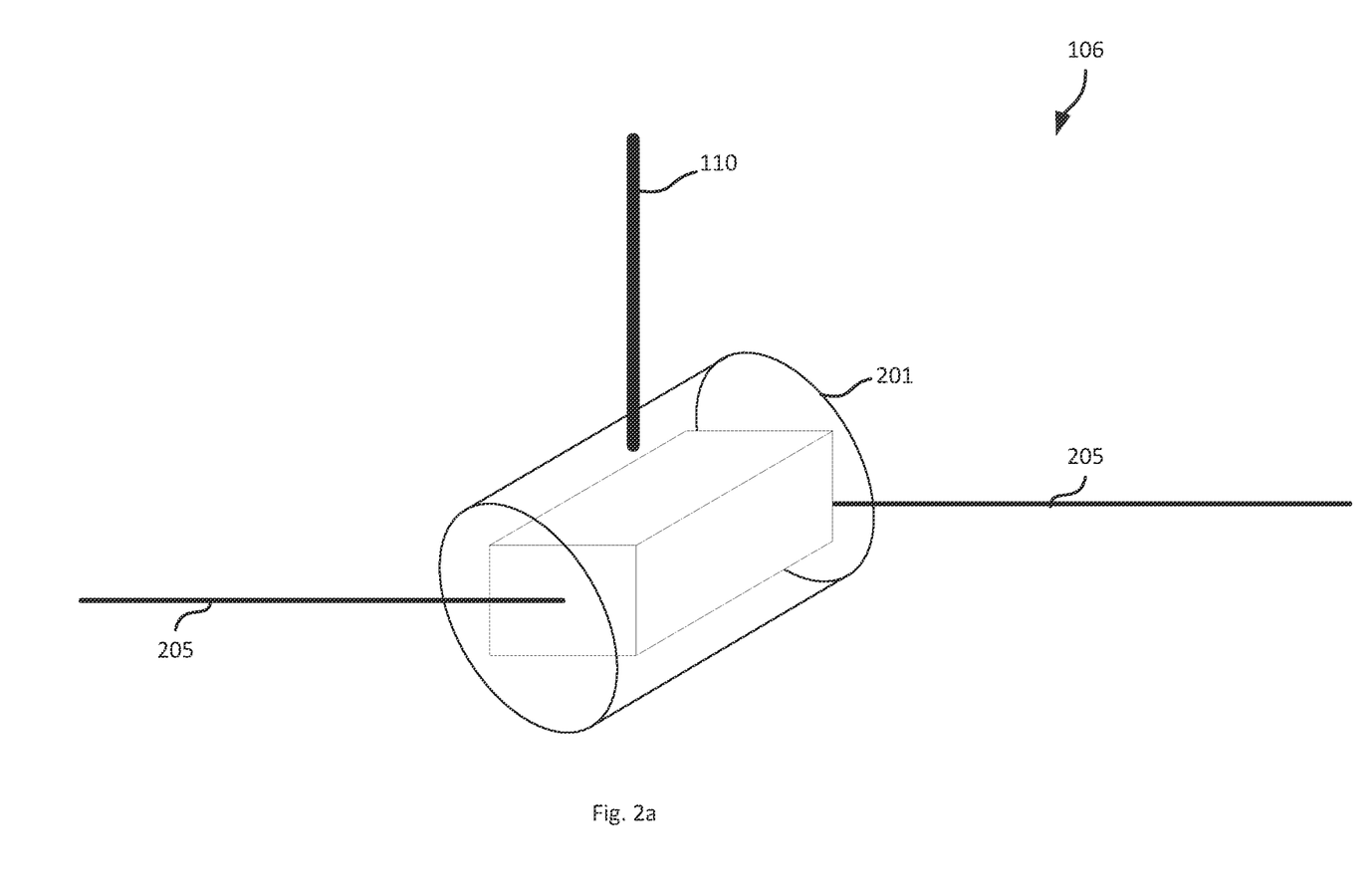
FIG. 2a is a front perspective view of a distributed acoustic sensing (DAS) unit used in the distributed acoustic sensing system of FIG. 1.
Figure 2B:
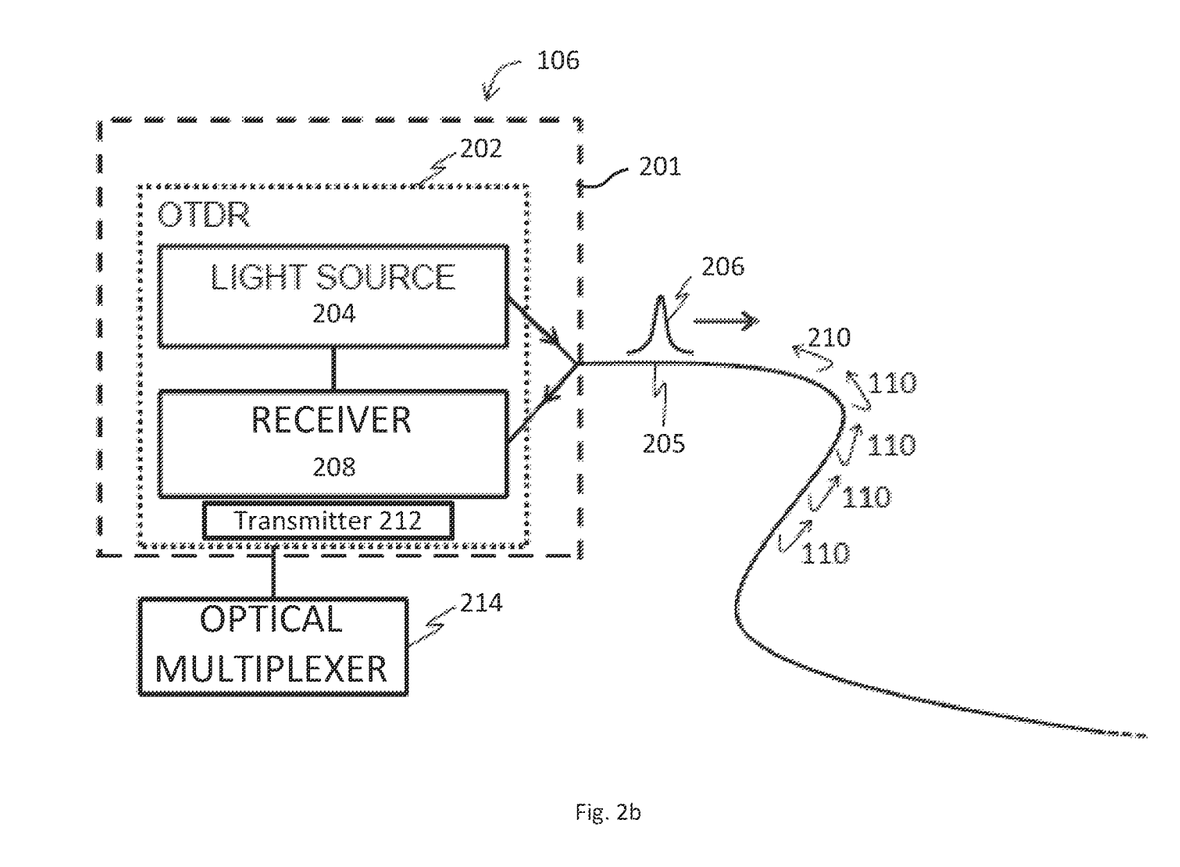

In the embodiment shown in FIGS. 1 and 2b, a receiver 208 in the DAS unit 106 receives reflected optical light that has been back scattered along the at least one fibre-optic sensing cable 205, the reflected optical light including acoustic information of the least one optical property that has been influenced by an acoustic disturbance in the marine environment. The reflected optical light from each sensing fibre-optic cable 205 is digitised at a data rate of 3.2 Gb/s and converted to an electrical signal. A demodulator in the DAS unit 106 demodulates the electrical signals to capture the acoustic information at a data rate of 200 Mb/s. A multiplexer located in each DAS unit 106 then multiplexes the two 200 Mb/s electrical signals to a single 400 Mb/s electrical signal. The DAS unit then converts this electrical signal into an optical signal and transmits this along cable 110 to the distribution hub 108. The distribution hub 108 optically multiplexes the three optical signals received from each of the DAS units 106 and transmits this multiplexed optical signal to the repeater 102 of the submarine communications cable 104 via cable 112. The loop back coupler at the repeater 102 digitally time-multiplexes and/or frequency multiplexes the multiplexed optical signal with the optical signals travelling along the fibre optic pairs of the submarine communications cable 104.

The fibre-optic submarine cable 104 also includes a power cable 304 (FIG. 3b) that supplies power to the repeater 102. Power is provided to the DAS unit(s) 106 from the repeater 102, optionally via any distribution hub(s) 108 or other intermediary network components. These intermediary network components also source their power from the fibre-optic submarine cable 104, via the repeater 102.

In one example, the power and data cables 110, 112 may comprise six wire connectors and a tether cable. Two of these wires may be a twisted pair cable for power distribution, for instance to the distribution hub 108 or the DAS unit 106, and the remaining four wires may be used for bidirectional data transmission between the distribution hub 108 or the DAS unit 106 and the repeater 102. The data transmission rates may be adjustable depending on the number of ports on the repeater 102. For example, a rate of 100 Mbs may be used between the distribution hub 108 or DAS unit 106 and the repeater 102. In another example, a rate of 10 Gb/s may be used by the repeater 102 transmitting data to the distribution hub 108 or DAS unit 106.

In the embodiment shown in FIG. 1, three DAS units 106A-106C are spaced apart from each other, for example in the order of 100 km apart, with each DAS unit 106A-C having two outwardly extending fibre-optic sensing cables, each having a length of about 50 km. The configuration shown in FIG. 1 simulates a detector with a detection footprint having a diameter of about 300 km and spans a larger submarine geographical area than would otherwise be spanned by any one of the DAS units 106 alone.

In some circumstances, different DAS units 106 may detect the same acoustic event in the marine environment, with the detection used to increase the spatial accuracy of locating the acoustic event. For example, an acoustic event may be detected by DAS units 106A, 106B but not by DAS unit 106C. Such detection may indicate, for example, that the corresponding occurrence is located in the marine environment between DAS unit 106A and 106B. Timing data may be used to further refine the determination of the position of the acoustic event, for example using triangulation.

An exemplary method for distributed acoustic sensing in a marine environment surrounding a repeater along a fibre-optic submarine communications cable includes the steps of: (a) transmitting outgoing light from a light source of at least one distributed acoustic sensing (DAS) unit in at least one fibre-optic sensing cable located in the marine environment; (b) receiving reflected light of the outgoing light at a receiver of the at least one DAS unit, the reflected light being outgoing light that has been back scattered along the at least one fibre-optic sensing cable and includes at least one optical property influenced by an acoustic disturbance in the marine environment; and (c) multiplexing, via an optical multiplexer, optical signals onto the fibre-optic submarine communications cable via a repeater, the optical signals carrying information on the at least influenced optical property.

Distributed Acoustic Sensing (DAS) Unit

One example of a distributed acoustic sensing (DAS) unit 106 that can be used with a repeater 102 along a deployed or existing fibre-optic submarine communications cable 104, in order to detect acoustic disturbances within the marine environment, is shown in FIGS. 2a-2b.

The DAS unit 106 includes a pressurised housing 201 for withstanding the high water pressures associated with various depths in the submarine environment, for example 0-7 km. Within the pressurised housing 201, the DAS unit 106 includes a coherent optical time-domain reflectometer (OTDR) 202.

The OTDR 202 includes a light source 204 to transmit outgoing light 206 in at least one fibre-optic sensing cable 205, located in the marine environment and extending outwardly from the DAS unit. The outgoing light 206 to be sent into the optical fibre 205 may be in the form of one or more short optical pulses. The light source 204 may comprise one or a plurality of components, for example one or a plurality of laser devices.

The OTDR 202 includes a receiver 208, for example incorporating a photodetector, which is configured to receive and detect reflected light 210 of the outgoing light 206, comprising light that has been back scattered along the fibre-optic sensing cable 205. If the OTDR 202 is phase-sensitive, phase fluctuations in the reflected light may be additionally or alternatively measured. The reflected light 210 includes at least one optical property that has been influenced by an acoustic disturbance in the marine environment. As described above, the magnitude of the reflected light 210 may be indicative of the severity or proximity of the acoustic disturbance in the marine environment. In another example, the timing of reflected light 210 may be indicative of the location of the acoustic event.

The reflected light 210 is considered an optical signal that carries information on the at least one optical property that has been influenced by the acoustic disturbance. The DAS unit 106, for example by the OTDR 202, communicates a first signal based on this information to the optical multiplexer 214. The optical multiplexer 214 multiplexes a second signal onto the fibre-optic submarine cable 104. The optical signals multiplexed onto the fibre-optic submarine communications cable 104 carrying information on the at least one optical property influenced by the acoustic disturbance.

As described above, the light source 204 and receiver 208 pair may be provided in an optical time-domain reflectometer (OTDR) 202. The OTDR 202 includes a transmitter 212 for transmitting data signals representative of the reflected light 210 received by the OTDR 202.

The presently disclosed system and method of distributed acoustic sensing may be used with phased array processing and beam forming techniques. As mentioned above, outgoing light 106 may be sent into the fibre-optic sensing cable 205 as a series of optical pulses. The reflected light 210 produced as a result of backscattering of the outgoing light 106 along the fibre-optic sensing cable 205 is recorded against time at the receiver 208. This configuration permits determination of an acoustic signal (amplitude, frequency and phase) at every distance along the fibre-optic sensing cable 205. In one embodiment, the receiver 208 records the arrival times of the pulses of reflected light 210 in order to determine the location and therefore the channel where the reflected light was generated along the fibre-optic sensing cable 205. This phased array processing may permit improved signal-to-noise ratios in order to obtain improved long range detection of a marine acoustic source, as well as the direction, speed, location and classification of the acoustic source.

In order to determine the angle or the distance of the acoustic source from the fibre-optic sensing cable 205, beamforming techniques may be applied. Beamforming techniques involve the summation of an acoustic time series from adjacent channels along the fiber cable with varying degrees of time delay across each channel (or spatial position along the cable). The degree of time delay added to the acoustic channels in the summation processes alters the direction or location where the beam formed by the array processing becomes most sensitive. In one embodiment, beamforming is performed in the time domain by sending the outgoing light 106 into the fibre-optic sensing cable 205 as a series of optical pulses. Each optical pulse produces a measurement of the acoustic time series for each channel along the sensing cable. Beams are then formed mathematically from an evolving time series by varying the time delay of each channel going in to a summation. With no delay added across the channels a beam is formed that is strongest at 90 degrees to the axis of the fiber cable. As incremental time delay is added across the channels, the main lobe of the beam moves spatially towards being most sensitive along the axis of the cable. These beamforming techniques may result in a narrow scanning beam that may yield direction of the marine acoustic source and its location relative to the fibre-optic sensing cable 205 in order to selectively monitor different zones in the acoustic field with improved array gain range and enhanced detection capabilities.

Submarine Communications Cable and Repeater

Figure 3A:
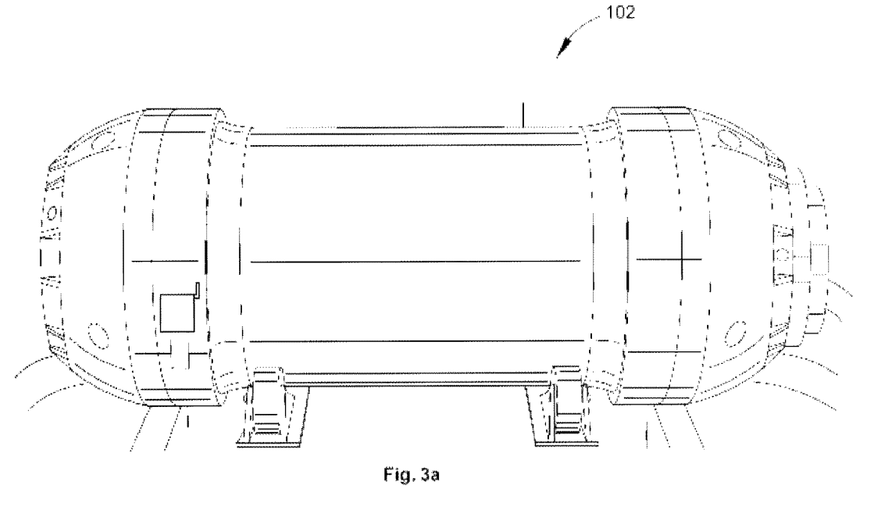
FIG. 3a is a front view of a repeater for use with the DAS unit of FIGS. 2a-2b.
Figure 3B:
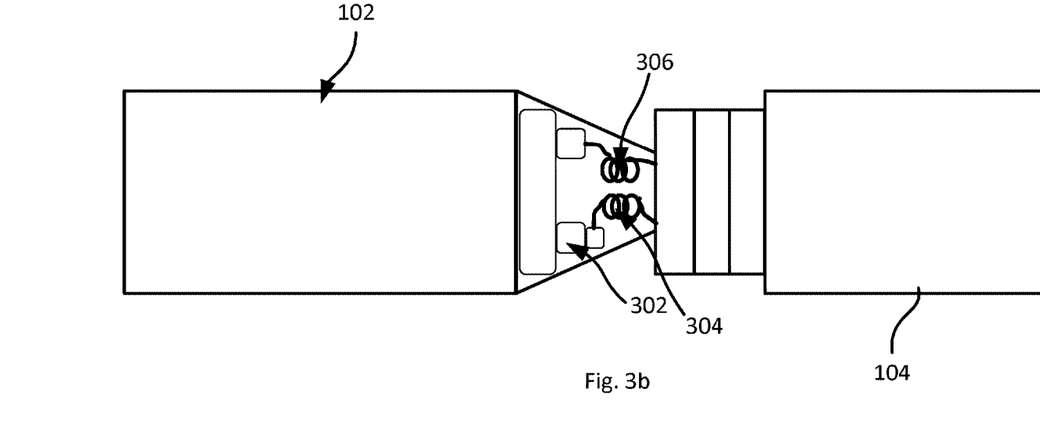
FIG. 3b is a partial diagram of the repeater of FIG. 3a connected to a submarine communications cable.

An embodiment of a modified repeater 102 is shown in FIGS. 3a-3b, which as described above acts as an optical amplifier to the optical signals transmitted along the submarine communications cable 104. The repeater 102 comprises a port 302 for coupling to the power and data cable 112. The repeater 102 transmits received signals relating to an acoustic disturbance from the DAS unit(s) 106 onto the fibre-optic submarine communications cable 104. The repeater 102 also transmits power to the DAS unit(s) 106.

Figure 4:
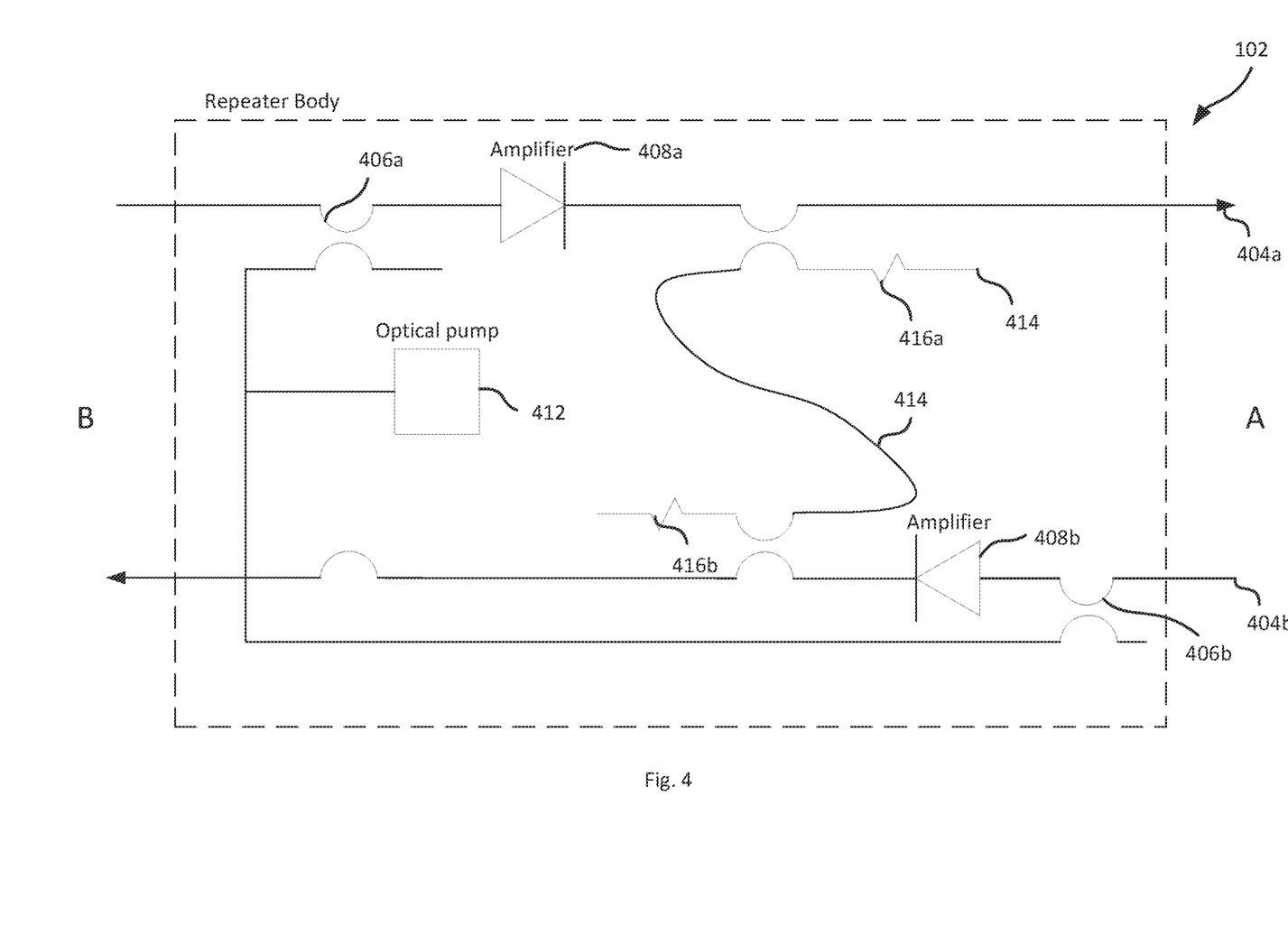
FIG. 4 is a diagram of a loopback coupler module of the repeater shown in FIGS. 3a-3b.

In one embodiment, the optical multiplexer 214 is implemented in a loopback coupler module 414 of the repeater 102 of the submarine communications cable 104, for example as shown in FIG. 4. The submarine communications cable 104 comprises multiple optic-fibre pairs, where each optic-fibre pair provides a bidirectional connection with a symmetric data capacity between two land-based communication stations. One example of an optic-fibre pair comprising first and second optic-fibres 404a, 404b is shown in FIG. 4.

Couplers 406a, 406b are located along each of the first and second optic-fibres 404a, 404b at the repeater 102 to couple the optical pump unit 412 to the optical amplifiers 408a, 408b. An optical light signal sent along the first and second optic fibres 404a, 404b of the submarine communications cable 102 is amplified at the amplifiers 408a, 408b. The resulting amplified optical signal is then transmitted a further distance along the submarine communications cable 102.

As shown in FIG. 4, the repeater 102 further comprises a loopback coupler module 414 that is coupled to the first and second optic fibres 404a, 404b, respectively. The loopback coupler module 414 may comprise Fibre Bragg Gratings (FBGs) 416a, 416b. Each FBG 416a, 416b may reflect a wavelength of optical light sent within the first or second optical fibres 404a or 404b of the submarine communications cable 104 back in the direction of the land-based source station, while transmitting all other wavelengths along the remaining optical fibre 404a or 404b towards the land-based destination station. For example, a wavelength of optical light sent along optic-fibre 404b of the submarine communications cable 102 may be reflected by the loopback coupler module 414 and transmitted along optic-fibre 404a back in the direction of the land-based source station of optic-fibre 404b (corresponding to the direction of the land-based destination station of optic-fibre 404a) as indicated by A in FIG. 4, while the remaining wavelengths of light are transmitted along optic-fibre 404b towards the destination land-based station of optic-fibre 404b (corresponding to the direction of the land-based source station of optic-fibre 404a), as indicated by B in FIG. 4.

As described herein above, in one embodiment, the loopback coupler module 414 is coupled directly to one or more DAS units 106. In another embodiment, the loopback coupler module 414 may be coupled to the DAS units 106 via one or more distribution hubs 108, and/or other network components.

The FBG's 416a, 416b of the loopback coupler module 414 may be used to multiplex the reflected light from each DAS unit 106 into a combined optical signal at a particular wavelength. The resulting multiplexed optical signal includes at least one optical property that has been influenced by an acoustic disturbance in the marine environment, as detected by one or more DAS units 106. This multiplexed optical signal is then transmitted along optical fibre 404a or 404b. The optical signal may be amplified by one or more repeaters of the submarine communications cable. In one example, the multiplexed optical signal is transmitted along optical fibre 404a of the submarine communications cable 104 towards a destination land-based station of optic fibre 404a.

In some embodiments, the multiplexed optical signal is a time-multiplexed and/or frequency multiplexed signal, with other optical signals that are transmitted along the fibre-optic submarine communications cable 104.

In some embodiments, the optical signals detected by the one or more DAS units 106 are passed directly onto the submarine communications cable 104. In other embodiments the signals detected by the one or more DAS units 106 are processed and an output of the processing is communicated onto the submarine communications cable 104. For example, the optical transmitter may generate an optical signal for transmission along the submarine communications cable 104 only if the fluctuations of the reflected light received by each DAS unit 106 from the fibre-optic sensing cable/s 105 are above a predetermined threshold value, indicating a relatively severe acoustic event or an acoustic event that has occurred close to the fibre-optic sensing cables of the relevant DAS unit(s) 106. The transmitted signal may be a simple flag indicating occurrence of the event, or contain information about the event, for example a location determined by the processing of the signal or information to enable a location determination or other analysis to be performed at a remote processor, for example a land-based processor.

Optical Signal Processing

Figure 5:
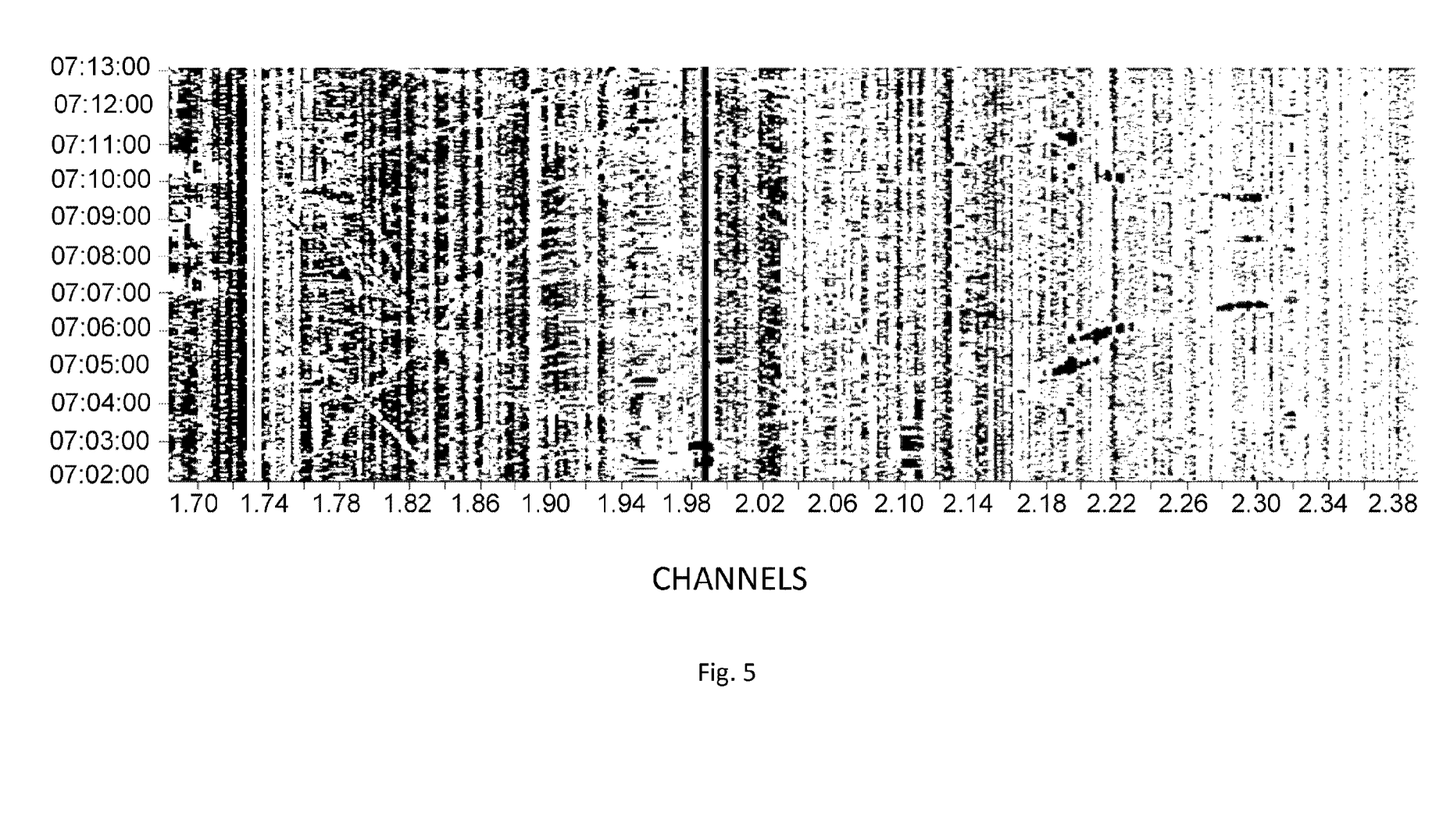
FIG. 5 is a density plot of electrical signals processed from the DAS unit of FIGS. 2a-2b.

As described above, the signals from the DAS units 106 may be processed, for example to generate an alert signal representative of the detected acoustic event. FIG. 5 illustrates an example density plot combining electrical signals 512 obtained from the multiplexed optical signal. The horizontal axis (labelled "Channel") represents position along a sensing optical-fibre of a DAS unit 106, the vertical axis (labelled "Time") represents time, and the colour-coded amplitude of the plot represents acoustic intensity. In FIG. 5, features such as straight lines with relatively constant gradients are associated with moving objects (with the gradients being indicative of speed) that cause the relevant acoustic event detected by the DAS unit 106. The acoustic event being determined may be indicative of specific stationary or moving occurrences, such as marine vessels, travelling through the marine environment surrounding the DAS unit 106.

An alert may also be generated by classifying the alert signal into one or more classes of alerts (e.g. border intrusion etc.) based on acoustic signatures of the fluctuations of the optical signal received at the land-based station. Some techniques in alert classification are summarised and further referenced in, for example, "Fiber Sensing: Optical fiber monitors the arterial networks of commerce", Laser Focus World, volume-51, issue-08, 8 Jun. 2015 (http://www.laserfocusworld.com/articles/print/volume-51/issue-08/features/fiber-sensing-optical-fiber-monitors-the-arterial-networks-of-commerce.html). In one configuration, the marine environment to be sensed is divided into multiple zones corresponding to different sections along the fibre-optic submarine communications cable 104. In this configuration, each zone or corresponding section is associated with generation of one or more selected classes of alerts (or non-generation of one or more excluded classes of alerts). For example, the classes of alerts selected for generation may be associated with a vessel travelling through the marine environment. In this example, the classes of alerts may increase in importance as the marine vessel travels through the respective zones of the marine environment and towards a coastline. Additionally, the classes of alerts excluded for generation may be associated with wave motion, tectonic movement or undersea volcanic activity.

Acoustic Calibration

A marine environment through which the distributed acoustic sensing is conducted is likely an area with unwanted acoustic interference caused by wave action, biologics or the like. The unwanted acoustic interference may interfere, mask or otherwise affect the characteristics of the acoustic event being determined. In one configuration, to reduce the impact of unwanted acoustic interference, spectral filtering is applied to the detected fluctuations of the received optical light at the land-based station in order to reduce or remove fluctuations associated with the unwanted acoustic interference.

Further, spectral filtering may be selectively applied to one or more zones of the marine environment. Different zones of the marine area may require different or no spectral filtering. For example, further away from the coastline there may be less marine vessel noise and there may be no need to apply filtering techniques. Alternatively or additionally, the disclosed method may selectively apply the spectral filtering to fluctuation based on time, e.g. the time of the day or the day of the week.

Spatial Calibration

In one embodiment, a position along a fibre-optic sensing cable 205 extending from a DAS unit 106 and a location in the geographical area are spatially calibrated. The spatial calibration may include generating an acoustic calibration signal (e.g. a single-frequency tone at 420 Hz+/−5 Hz selected to be distinct to typical noise sources in the marine environment) at specific locations within the marine environment to cause fluctuations for detection along the length of the fibre-optic sensing cable 205. By restricting the acoustic calibration signal frequency to 420 Hz+/−5 Hz, other acoustic noise sources in the marine environment can be removed. With the removal of other acoustic noise sources, one strong signal that corresponds to the single-frequency tone can be detected, as can be observed in FIG. 5c at around Channel 1990. An optical fluctuation corresponding to the calibration acoustic signal is expected to be detected at a specific position along the fibre-optic sensing cable 205. The corresponding pair of the location within a marine environment and the position along the fibre-optic sensing cable 205 where the fluctuation is detected forms a spatial calibration point. Further spatial calibration points along the fibre and within the marine environment may be formed.

If an acoustic event is detected at a position along the fibre between two calibration points, an interpolation (e.g. linear or nonlinear) may be used to estimate the location of the corresponding occurrence within the marine environment. If an acoustic event is detected at a position along the fibre beyond the first and the last calibration points, an extrapolation (e.g. linear or nonlinear) may be used to estimate the location of the corresponding occurrence within the marine environment.

Stationary or Moving Occurrences

As mentioned above, acoustic events being determined may be indicative of specific stationary or moving occurrences. For example, as illustrated in FIG. 5c, features such as straight lines with relatively constant gradients are associated with the moving objects (with the gradients being indicative of speed) that cause the relevant acoustic events detected by the DAS unit 106. The processing of the multiplexed optical signal at the land-bases station may involve determining whether an acoustic event is stationary or moving. For example, the determination may include comparing an estimated speed (e.g. based on the gradient of a straight line) of the acoustic event with a threshold speed value. Where the estimated speed of the acoustic event is below the threshold speed value, the acoustic event is determined to be stationary, otherwise it is determined to be moving. In the instance that the acoustic event is moving, further processing may occur to suppress the generation of the alert signal representative of the acoustic event. This suppression is useful in avoiding false alarms due to the number of occurrences of benign marine occurrences (e.g. wave motion) can be much higher than that of genuine threats (e.g. marine vessels entering the marine environment). Without such suppression, a high number of false alarms may be generated to a point which renders the disclosed method ineffective. In one arrangement, the threshold speed value may be adjusted to reduce the number of false alarms.

Now that arrangements of the present disclosure are described, it should be apparent to the skilled person in the art that the described arrangements have the following advantages:

- The configuration of the DAS units within the marine environment may provide sensing capabilities and monitoring of vast maritime environments and wider surveillance apertures compared to conventional methods.
- The ability of a DAS unit 106 to couple to a repeater of a fibre-optic submarine communications cable for powering and communication purposes may provide permanent monitoring capabilities for the marine environment.
- The DAS units, being located on the seafloor, rather than on or above the ocean surface, provide a covert mechanism of monitoring the marine environment.
- A higher number of channels, for example, 10,000-30,000 may be used by the disclosed method and system resulting in more accurate monitoring of the marine environment compared to conventional methods.

It will be understood that the invention disclosed and defined in this specification extends to all alternative combinations of two or more of the individual features mentioned or evident from the text or drawings. For example, any one or more the calibration steps can be used separately or in conjunction. All of these different combinations constitute various alternatives of the present disclosure.

The invention claimed is:

1. A system for distributed acoustic sensing in a marine environment surrounding a repeater along a fibre-optic submarine communications cable, the system comprising:
   at least one distributed acoustic sensing (DAS) unit, comprising:
     a light source that is configured to transmit outgoing light in at least one fibre-optic sensing cable located in the marine environment; and
     a receiver configured to receive reflected light of the outgoing light that has been back scattered along the at least one fibre-optic sensing cable, the reflected light including at least one optical property influenced by an acoustic disturbance in the marine environment; and
   an optical multiplexer for multiplexing optical signals onto the fibre-optic submarine communications cable via the repeater, the optical signals carrying information on the at least one optical property influenced by an acoustic disturbance in the marine environment.

2. The system of claim 1, wherein the optical multiplexer is configured to multiplex the optical signals onto the fibre-optic submarine communications cable via a loop back coupler of the repeater.

3. The system of claim 1, wherein the optical multiplexer is configured to time-multiplex and/or frequency-multiplex the optical signals with other optical signals carried on the fibre-optic submarine communications cable.

4. The system of claim 1, wherein the optical multiplexer includes an optical transmitter configured to generate the optical signals based on the information on the at least one optical property influenced by an acoustic disturbance in the marine environment.

5. The system of claim 1, wherein the at least one DAS unit is powered by the repeater.

6. The system of claim 1, wherein the at least one fibre-optic sensing cable comprises at least two fibre-optic sensing cables and wherein the at least one DAS unit comprises multiple spaced apart DAS units, wherein the DAS units are connected via a distribution hub which in turn communicates with the repeater via one or more combined or separate power and data cables.

7. The system of claim 1, wherein at least one of the fibre-optic sensing cables is provided with a magneto-restrictive coating for distributed magnetic sensing in the marine environment surrounding the repeater.

8. The system of claim 7, further comprising a combination of fibre-optic acoustic and fibre-optic magneto-restrictive sensing cables to provide both distributed acoustic and distributed magnetic sensing in the same marine environment.

9. The system of claim 1, wherein the at least one DAS unit further includes a housing that contains the light source and the receiver.

10. A system for distributed acoustic sensing in a marine environment surrounding a repeater along a fibre-optic submarine communications cable, the system comprising:
   at least one distributed acoustic sensing (DAS) unit, comprising:
     a light source that is configured to transmit outgoing light in at least one fibre-optic sensing cable located in the marine environment; and
     a receiver configured to receive reflected light of the outgoing light that has been back scattered along the at least one fibre-optic sensing cable, the reflected light including at least one optical property influenced by an acoustic disturbance in the marine environment; and
   an optical multiplexer for multiplexing optical signals onto the fibre-optic submarine communications cable via the repeater, the optical signals carrying information on the at least one optical property influenced by an acoustic disturbance in the marine environment;
   wherein beam forming is applied to an acoustic time series to generate a scanning beam to determine one or more of a location and direction of acoustic disturbances.

11. The system of claim 10, wherein the at least one DAS unit is configured to implement beam forming along the at least one fibre-optic sensing cable such that the scanning beam yields the direction of the marine acoustic disturbance and its location relative to the fibre-optic sensing cable.

12. The system of claim 10, wherein the optical multiplexer is configured to multiplex the optical signals onto the fibre-optic submarine communications cable via a loop back coupler of the repeater.

13. The system of claim 10, wherein the optical multiplexer is configured to time-multiplex and/or frequency-multiplex the optical signals with other optical signals carried on the fibre-optic submarine communications cable.

14. A method for distributed acoustic sensing in a marine environment surrounding a repeater along a fibre-optic submarine communications cable, the method comprising:
transmitting outgoing light from a light source of at least one distributed acoustic sensing (DAS) unit in at least one fibre-optic sensing cable located in the marine environment; and
receiving reflected light of the outgoing light at a receiver of the at least one DAS unit, the reflected light being outgoing light that has been back scattered along the at least one fibre-optic sensing cable and includes at least one optical property influenced by an acoustic disturbance in the marine environment; and
multiplexing, via an optical multiplexer, optical signals onto the fibre-optic submarine communications cable via the repeater, the optical signals carrying information on the at least one optical property influenced by an acoustic disturbance in the marine environment.

15. The method of claim 14, wherein the multiplexing of the optical signals onto the fibre-optic submarine communications cable is performed via a loop back coupler of the repeater.

16. The method of claim 14, wherein the multiplexing occurs via time-multiplexing and/or frequency multiplexing of the optical signals onto the fibre-optic submarine communications cable.

17. The method of claim 14, further comprising generating, at an optical transmitter of the optical multiplexer, the optical signals based on the information on the at least one optical property influenced by an acoustic disturbance in the marine environment.

18. The method of claim 14, wherein at least one of the at least one fibre-optic sensing cable is provided with a magneto-restrictive coating for distributed magnetic sensing in the marine environment surrounding the repeater.

19. The method of claim 14, wherein time series acoustic channels are beam formed and result in the formation of at least one scanning beam.

20. The method of claim 19, wherein the at least one DAS unit is configured to implement beam forming, such that the scanning beam yields at least one of a direction of the acoustic disturbance and its location relative to the fibre-optic sensing cable.

* * * * *